Patented Sept. 4, 1923.

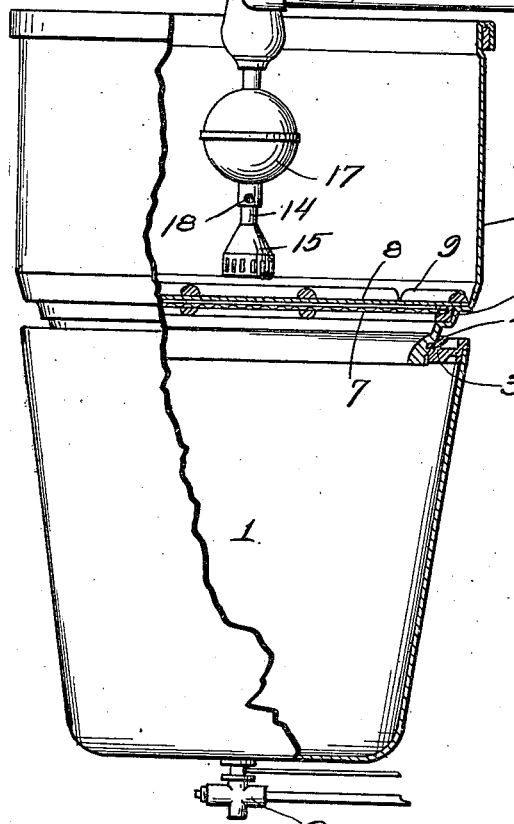
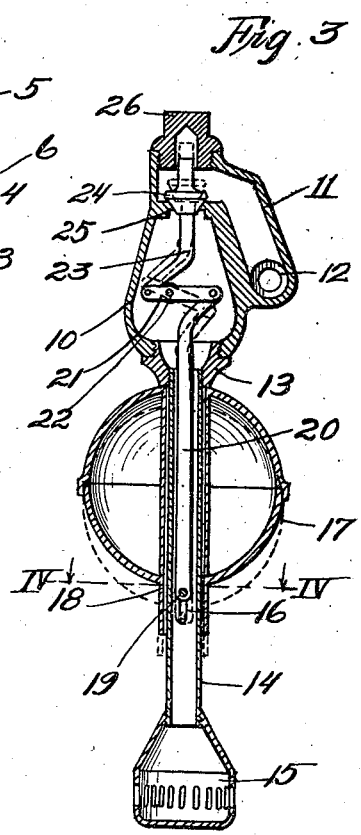
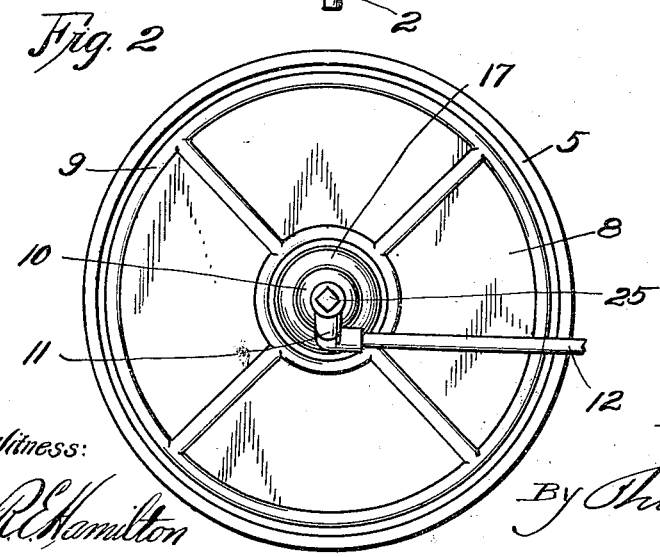

1,467,170

UNITED STATES PATENT OFFICE.

HENRY D. KELLY, OF KANSAS CITY, MISSOURI.

FLOAT-VALVE CONTROL FOR LEACHER BUCKETS.

Application filed April 4, 1921, Serial No. 458,602. Renewed March 12, 1923.

*To all whom it may concern:*

Be it known that I, HENRY D. KELLY, citizen of the United States, and resident of Kansas City, county of Jackson, State of Missouri, have invented a certain new and useful Improvement in Float-Valve Controls for Leacher Buckets, of which the following is a complete specification.

This invention relates to float valve attachments for leacher buckets, used in connection with vacuum coffee urns and my object is to produce a valve of such character that the flow of water into the leacher bucket will be automatically cut off when the water reaches a predetermined height.

With the vacuum system as now used, the operators of coffee urns will start the flow of water into the leacher bucket and will then continue their work leaving the water turned on. It has been found that sometimes the vacuum is not working satisfactorily, or the water is flowing too rapidly into the leacher bucket to be taken into the beverage jar by the vacuum, and under these conditions the leacher will rapidly fill with water and it will overflow the sides of the urn causing a loss both of coffee and of time in cleaning and washing the urn.

My object is to produce means whereby the overflowing of the leacher jar will be automatically guarded against, by the closing of the valve within the leacher bucket, controlling the flow of water.

A still further object is to produce a device of this character of simple, strong, durable, efficient and inexpensive construction; and in order that it may be fully understood reference is to be had to the accompanying drawing, in which:

Figure 1 is a side view of a leacher bucket and beverage jar in operative relation and partly broken away to illustrate the device of the invention.

Figure 2 is a top plan view of the same.

Figure 3 is an enlarged vertical section taken through the device of the invention.

Figure 4 is a section on the line IV—IV of Figure 3.

In the said drawing, where like reference characters identify corresponding parts in all of the figures, 1 is a beverage jar equipped at its bottom with the customary vacuum producing means, and at its mouth with any suitable means for forming an abutting shoulder 3 for the reception of a gasket 4 secured to the lower edge of the leacher bucket 5, formed near its lower edge with means for supporting a spider 6 upon which rests a screen 7 to act as a support for a paper disk 8 through which the coffee is drawn by the vacuum produced in jar 1 and upon which fits a second spider or weight ring 9 to prevent buckling of the filter disk as is customary in vacuum urn construction.

Secured in any suitable manner above the leacher bucket and depending into the same is a valve casing 10 provided with an enlargement 11 to form a water passage, and with which is connected a water inlet pipe 12. Secured in the open lower end of casing 10 is a tubular plug 13 with which is connected a water pipe 14 depending into the leacher bucket and provided with a nozzle 15 for spraying the water throughout the body of ground coffee, it being understood that the nozzle 15 will underlie the ground coffee in the leacher bucket, as customary.

At any convenient point in the length of the water pipe 14, a slot 16 is formed, for a purpose which will hereinafter appear. A float member 17 mounted on a guide tube 18 has sliding movement on the water pipe 14, and near the lower end of said guide 18 a pin 19 is secured in said guide, and passes through the slot 16 in the water pipe and through a perforation in the lower end of a link 20 which has pivotal connection at its upper end with a lever 21 pivoted in casing 10, as at 22. The opposite end of lever 21 is pivoted to the stem 23 of a valve 24 adapted to fit in a valve seat 25 formed in the upper part of casing 10, the upper end of the valve stem being adapted to be guided by the hollow bore of a guide cap 26 closing the upper end of casing 10.

By reference to Figure 3, it will be seen that ordinarily the weight of the float 17 will hold the valve 24 open and the flow of water into the leacher will be unimpeded, but that as the water level rises to a predetermined level in the leacher bucket, the float will move upwardly and through its pin 19 will move the link 20 upwardly, which through lever 21 will pull downwardly on valve stem 23, and by the time the float has attained its limit of upward movement, the valve 24 will be clamped on its seat 25 and thus cut off the flow of water. It will be understood that as the water level in the leacher bucket is lowered by the flow of water into the beverage jar, the valve will be gradually opened due to the lowering of the float and more water will, therefore, be admitted, and that these operations will continue as long as the flow of water through pipe 12 remains unobstructed.

From the above description it will be apparent that I have produced a device of the character described, which possesses all of the features of advantage pointed out as desirable in the statement of the objects of the invention, and while I have described and claimed the preferred embodiment of the same, I reserve the right to make all changes properly falling within the spirit and scope of the appended claims.

I claim:

1. In a vacuum urn, a beverage jar, a leacher bucket upon and having air-sealed connection with the jar, a filter disk closing communication between said jar and bucket, a water-supply pipe for discharging into the bucket, a shut-off valve for said pipe, and a float in said bucket to close said valve when the water attains a predetermined level in the bucket.

2. In a device of the character described, a valve casing, a valve within said casing and having a valve stem, a lever pivoted in said casing and having one of its ends connected to said valve stem, a link pivoted to the other end of said lever and projecting from the valve casing, a discharge pipe connected to said casing and enclosing said link, and a float mounted on said discharge pipe and having an operative connection with said link.

3. In a device of the character described, a valve casing having a seat, a water inlet for said casing, a valve within the casing and having a stem projecting from its opposite faces, a plug secured in one end of the casing and having a bore adapted to form a guide for one end of the valve stem, a lever pivoted in the casing and linked to the other end of said valve stem, a link projecting from the casing and pivotally connected to the other end of said lever, a slotted discharge pipe connected to the casing at said end from which the link projects, and a float mounted for sliding movement on said discharge pipe and having a connection through the slot thereof with said link.

In witness whereof I hereunto affix my signature.

HENRY D. KELLY.